United States Patent Office

2,904,572
NEW WATER-SOLUBLE COMPLEXES AND A PROCESS FOR THEIR PREPARATION

Xavier Bilger, Soisy-sous-Montmorency, and Jacques Pechmeze, Paris, France, assignors to Compagnie Francaise des Matieres Colorantes, Paris, France, a French body corporate No Drawing. Application November 26, 1956
Serial No. 624,195

4 Claims. (Cl. 260—438)

The present invention concerns new water-soluble complexes and a process for their preparation.

The obtaining of organometallic complexes of the Werner type, which are water-soluble and contain chromium and an organic component in the cation, is described particularly in the U.S. Patents Nos. 2,273,040, 2,356,161, 2,524,803 and 2,549,220, in French Patents Nos. 1,110,678, 1,110,459 and 1,130,229 and in U.S. patent applications Serial Nos. 548,782 of November 23, 1955, 548,765 of November 23, 1955, and 558,859 of January 13, 1956.

Although U.S. Patent No. 2,549,220 mentions the possibility of manufacturing water soluble complexes of iron, manganese, cobalt and nickel with fatty acids, it does not appear that such complexes have ever been prepared and the attempts of the applicants to obtain them have been unsuccessful.

It has now been found that mixed complexes which are completely soluble in water can be obtained if an organic substance insoluble in water selected from the carboxylic acids and their functional derivatives, phenolic compounds containing at least one other coordinatively unsaturated group, and keto-enol compounds, is reacted, in one or more stages, with a basic salt of trivalent chromium and a monovalent acid or a derivative of chromium capable of providing such a salt during the reaction, on the one hand, and a salt or hydroxide of a polyvalent metal other than chromium, on the other hand.

Among these polyvalent metals other than chromium may be mentioned the divalent metals such as $Mg^{++}$, $Fe^{++}$, $Be^{++}$, $Mn^{++}$, $Co^{++}$, $Ni^{++}$, $Zn^{++}$, $Hg^{++}$, $Pb^{++}$, $Cd^{++}$, $Cu^{++}$, $Sn^{++}$, the trivalent metals such as $Al^{+++}$, $Fe^{+++}$, $Mn^{+++}$, $Ni^{+++}$, $Co^{+++}$, $Sb^{+++}$, $Bi^{+++}$, $Ce^{+++}$, and the tetravalent metals such as $Th^{++++}$, $Ti^{++++}$, $Ce^{++++}$, $Zr^{++++}$, $Sn^{++++}$, and $Mo^{++++}$.

Among the organic components which can be used for obtaining these mixed complexes may be mentioned:

(a) Aliphatic or isocyclic, saturated or unsaturated, carboxylic acids, such as the fatty acids, the resin acids, the naphthenic acids, benzoic acid, naphthoic acid, crotonic acid, methacrylic acid, carboxylic acids substituted, for example, by halogen atoms, or by oxo, hydroxy, alkoxy, aryloxy, amino, nitro, or nitrile groups, heterocyclic carboxylic acids such as furan-carboxylic acid, indolylacetic acid, aliphatic or isocyclic, saturated or unsaturated, polycarboxylic acids such as adipic acid, sebacic acid or phthalic acid;

(b) Phenolic compounds of the isocyclic or heterocyclic series not containing —COOH, —SO$_3$H, —OSO$_3$H, or —PO$_3$H$_2$ groups, but containing at least one phenolic —OH group as well as one or more other co-ordinatively unsaturated and non-solubilising groups: these latter include, for example, the groups —OH, —CO—, —CHO, =O—, —COO—, —CO—N<, —NO, —NO$_2$, —N<, —N=N—,

—SO$_2$—, —SO$_2$—N<, and —SO$_2$—O—. These phenolic derivatives may also contain other non-solubilising groups such as alkyl, cyclo-alkyl, aryl, aralkyl, alkyl-aryl, nitrile groups or halogen atoms. (The phenolic compounds are particularly suitable for obtaining these mixed complexes when the co-ordinatively unsaturated and non-solubilising group is situated in the ortho or peri position with respect to the phenolic —OH group);

(c) Compounds able to give rise to a rearrangement of the keto-enol type. These compounds may belong to the aliphatic, isocyclic or heterocyclic series and, apart from the keto-enol group, they may contain other functional groupings with straight or branched chains. The chain or chains may be interrupted by hetero-atoms such as O, N, S, P or Si. Among these compounds may be mentioned, for example, the esters and amides of acylacetic acids, the beta-diketones, the beta-ketone aldehydes, the pyrazolones, the omega-cyanoketones, the sulphazones, the beta-oxo-sulphones, the esters and amides of malonic acid.

In order to prepare the mixed complexes according to the invention, one may proceed in one or other of the following ways:

First of all, a salt or a hydroxide of a polyvalent metal other than chromium may be reacted, according to known methods, with the organic compound which is to form the complex; a salt or complex which is not very soluble, or which is insoluble, in water is thus obtained, which will hereinafter be called "organometallic salt," for the sake of convenience.

Next, a basic salt of trivalent chromium and a monovalent acid, or a chromium compound capable of providing such a salt during the reaction, is reacted with the organometallic salt, preferably in an organic solvent, for example in an alcoholic medium, at an elevated temperature. For example, a solution or suspension of the organometallic salt and the basic chromium salt may be brought to ebullition and maintained at the boil until the water soluble complex is obtained; the basic salt of chromium may also be progressively added to an alcoholic solution or suspension of the organometallic salt; or the basic chromium salt may be prepared in an organic solvent medium and the organometallic salt added, or the basic chromium salt may be formed in the presence of the organometallic salt and the mixture kept at the boil until a water-soluble complex is obtained.

It is possible to prepare the organometallic salt in an organic solvent and to add the basic chromium salt, or to mix the organic compound which is to form the complex and the basic chromium salt, then to add the hydroxide or salt of the other polyvalent metal and to maintain at the boil until a water-soluble complex is obtained. There may likewise be added to a solution or suspension of the organic compound in an organic solvent medium a mixture of mixed basic salt of chromium and another polyvalent metal or a mixture of a chromium compound capable of being converted during the reaction into a basic salt of chromium, and a compound of another polyvalent metal.

Again, a chromate or dichromate of a polyvalent metal other than chromium can be reacted with the organic substance which is to form the complex, in the presence of a reducing agent and with the addition of monovalent acid; in this case, the basic salt of trivalent chromium and monovalent acid and the salt of the polyvalent metal other than chromium are intermediately formed. Also, an alkali metal chromate or dichromate can be reacted with the organic substance which is to form the complex, in the presence of a metal, such as zinc or iron, and with the addition of a monovalent acid; in this case also the basic salt of trivalent chromium and the salt of iron or zinc is formed intermediately.

Among the basic salts of chromium which can be used for carrying out the process of this invention may be mentioned the basic halides, nitrates and acetates. Chromium compounds capable of providing such basic chromium salts during the reaction are, for example, the hydroxide, halides, nitrate and acetate, the chromates and dichromates of the alkali metals or of polyvalent metals, chromyl halides, and chromic acid. These compounds of chromium may be used alone or in mixtures in the reaction for producing the complex.

When the solvent used in the preparation of the mixed complex is soluble in water, a solution of the complex is obtained which, after filtration of any mineral salts which may have been formed, can be diluted with water without giving a precipitate. If the solvent employed is insoluble in water, it is advantageous to remove it by evaporation, for example, under vacuum, after having filtered off any mineral salts which may have been formed. There may also be added to the solution sufficient water-soluble solvent to form an azeotropic mixture with a boiling point lower than that of the water-soluble solvent, and the azeotropic mixture distilled until the water-insoluble solvent is completely removed.

The methods of preparation of the mixed complexes according to the invention enumerated below are given by way of example, but is not outside the scope of the invention if, starting from a water-insoluble organic substance corresponding with the preceding definitions, a mixed water-soluble complex containing trivalent chromium and another polyvalent metal is obtained.

The complexes obtained according to the present process find application in industries concerned with fibrous materials such as, for example, textiles, paper, leather, and synthetic materials. Depending on their constitutions these complexes may have waterproofing, parasiticidal or fireproofing properties and they may serve as nourishing or dressing agents. Thus for example, the complexes according to the invention derived from fatty acids are excellent waterproofing agents and those derived from 8-hydroxy-quinoline have remarkable fungicidal properties.

A particularly interesting application of the present process is the conversion of 8-hydroxy-quinoline into mixed water-soluble complexes of copper and chromium, and their utilisation in the anti-fungal treatment of cellulosic materials.

In fact, it is known that copper 8-hydroxy-quinolate is to be ranked among the most powerful fungicidal agents, but up to the present, its application in the textile industry has been limited owing to its insolubility in water and in the majority of the usual organic solvents.

Among the processes at present known concerning the application of copper 8-hydroxy-quinolate to textile fibers, some employ a treatment with two baths, according to which the fabric, for example, is first impregnated with an aqueous solution of the sodium salt of 8-hydroxy-quinoline, then drained and passed into a bath containing a copper salt; the copper 8-hydroxy-quinolate is thus formed on the fabric. Copper 8-hydroxy-quinolate has also been applied to fabrics in dispersed form and its fixation has then been ensured by means of resins, such as alkyd resins or polyvinyl resins. It has also been proposed to dissolve copper 8-hydroxy-quinolate in an aqueous solution of a volatile organic acid, such as formic or acetic acids. The fabrics are impregnated in this solution, drained, then dried at a temperature of the order of 100° C. During the drying, the organic acid is eliminated and copper 8-hydroxy-quinolate is deposited on and in the fibers. This last process nevertheless has the disadvantages of all the strongly acid treatments of textile fibres.

Now, the mixed complexes of 8-hydroxy-quinoline with copper and chromium, obtained according to the invention, provide aqueous solutions having the desired concentration and possessing pH values near to 4. These solutions, suitably buffered, for example by means of hexamethylenetetramine, and possibly containing a cationic or non-ionic wetting agent to facilitate the impregnation, are perfectly suitable for the anti-fungal treatment of cellulosic fibres. This treatment, which constitutes a particular object of the invention, may be effected in the following way: the cellulosic material is impregnated with an aqueous solution having the composition indicated above, drained, then dried at temperatures which can be varied between 100 and 160° C.; during this drying the complex is rendered insoluble. The advantages of this process are as follows: (i) the 8-hydroxy-quinolate is applied in a single aqueous bath; (ii) the pH of the impregnating bath is approaching neutrality, which avoids any deterioration of the fibres; (iii) the solution of the complex penetrates completely to the interior of the fibres, which gives to the fabrics treated according to the process a protection against attack by moulds which is very stable to washing; (iv) since the 8-hydroxy-quinolate is better distributed on and in the fibres, and has a better resistance to washing, it can be employed in quantities 5 to 10 times smaller than when it is used in dispersed form; (v) the use of resins for fixing the copper-8-hydroxy-quinolate on the fibres is unnecessary; and (vi) finally, since this complex is compatible with complexes of the chromium stearato-chloride type, it is possible to give to the fabrics, in a single treatment, a resistance to moulds and a permanent waterproofing.

It should also be noted that aqueous solutions containing thermosetting aminoplastic resins and mixed complexes of 8-hydroxy-quinoline prepared according to the invention are more stable than aqueous solutions containing thermosetting aminoplastic resins and the simple copper salt of 8-hydroxy-quinoline.

The following examples, in which the parts given are parts by weight, unless the contrary is indicated, illustrate the present invention without however limiting it.

440 parts of aluminium stearate are suspended in 2000 parts of isopropyl alcohol. 405 parts of chromic chloride hexahydrate are added and the mixture refluxed. The aluminium stearate is dissolved at the end of 20 to 30 minutes boiling. The mixture is heated for a further hour and then left to cool. There is thus obtained an alcoholic solution of a mixed stearic acid-aluminium-chromium complex, blue-green in colour, and completely soluble in water.

30 parts of the alcoholic solution of the complex thus prepared are run into 500 parts of water; 60 parts of an aqueous solution containing 5% of hexamethylenetetramine are added and the solution obtained is made up to 1000 parts with water. A cotton twill fabric is impregnated in this bath and drained to 100%, then dried at 100–110° C. A perfectly waterproof fabric is thus obtained which retains this property after washing at 45° C. with a solution containing per litre, 5 g. of soap and 2 g. of sodium carbonate.

*Example 2*

A mixture composed of 852 parts of stearic acid, 363 parts of aluminium chloride hexahydrate, 665 parts of chromic chloride hexahydrate and 2500 parts of isopropyl alcohol is prepared. This mixture is agitated and treated with 1500 parts of an alcoholic solution of caustic potash containing 168 parts of caustic potash. The mixture is brought to the boil and heated under reflux for one hour. After cooling, the mineral salts formed are filtered off. There is thus obtained an alcoholic solution of a mixed stearic acid-aluminium-chromium complex whose properties are comparable to those of the solution obtained in Example 1.

*Example 3*

A mixture composed of 532 parts of chromic chloride hexahydrate and 1200 parts of isopropyl alcohol is vigorously agitated and treated with 1500 parts of an alcoholic solution containing 112 parts of caustic potash.

568 parts of stearic acid and 241 parts of crystalline copper nitrate are then added and the mixture boiled for one hour. After cooling, the precipitated potassium salts are filtered off. There is thus obtained an alcoholic solution of a mixed stearic acid-copper-chromium complex, which is completely soluble in water and which can be employed in waterproofing.

*Example 4*

77 parts of crystalline sodium dichromate, 197 parts of crystalline manganese chloride, 399 parts of chromic chloride hexahydrate and 2500 parts of isopropyl alcohol are placed in an apparatus provided with a stirrer and a reflux condenser. This mixture is stirred and refluxed until the dichromate is completely reduced to trivalent chromium. 512 parts of palmitic acid are then added and the mixture boiled for one hour. After cooling, the precipitated sodium chloride is filtered off; a clear alcoholic solution of a mixed palmitic acid-chromium-manganese complex which is completely soluble in water is obtained.

*Example 5*

A mixture composed of 200 parts of lauric acid, 810 parts of chromic chloride hexahydrate, 140 parts of cobalt hydroxide and 1200 parts of isopropyl alcohol is refluxed for one hour. An alcoholic solution of a mixed lauric acid-chromium-cobalt complex is obtained, which is blue in colour and completely soluble in water.

*Example 6*

512 parts of palmitic acid, 238 parts of cobaltous chloride hexahydrate and 1600 parts of isopropyl alcohol are charged into an apparatus provided with a stirrer and a reflux condenser. This mixture is vigorously agitated and treated gradually with 1000 parts of an alcoholic solution of caustic potash containing 112 parts of potash. A violet precipitate is gradually formed. 800 parts of chromic chloride hexahydrate are then added and the whole is brought to the boil, and refluxed for 45 minutes. It is left to cool and the precipitated potassium chloride is filtered off. An alcoholic solution of a mixed complex of blue colour is thus obtained which is completely soluble in water.

*Example 7*

A mixture composed of 447 parts of crystalline sodium dichromate and 2500 parts of isopropyl alcohol is refluxed and vigorously agitated. The heating is stopped and 365 parts of gaseous hydrochloric acid are introduced by means of a plunger. The reduction of the dichromate to trivalent chromium is exothermic and maintains the mixture at the boil. When all the hydrochloric acid has been introduced, ebullition is maintained for a further 30 minutes and 568 parts of stearic acid are added. After heating under reflux for 30 minutes, an alcoholic solution is obtained which gives rise to the formation of a precipitate when it is run into water. 240 parts of cobaltous chloride hexahydrate are then added and the mixture maintained at the boil for a further 30 minutes. After cooling, the precipitated sodium chloride is filtered off. An alcoholic solution of a mixed complex of blue colour is thus obtained, which is completely soluble in water and which has very good waterproofing properties.

*Example 8*

A mixture composed of 1136 parts of stearic acid, 190 parts of crystalline sodium dichromate, 900 parts of nickel chloride hexahydrate, 1000 parts of chromic chloride hexahydrate and 8000 parts of isopropyl alcohol is agitated and refluxed for 30 minutes. After cooling, the precipitated mineral salts are filtered. An alcoholic solution of a mixed complex of green colour is obtained, which is completely soluble in water and which can be used in the waterproofing of fibrous materials.

*Example 9*

A. 1320 parts of copper 8-hydroxy-quinolate are suspended in 5600 parts of isopropyl alcohol; 3936 parts of chromic chloride hexahydrate are added and the mixture boiled for two to three hours; 10,500 to 10,800 parts of an alcoholic solution of a mixed 8-hydroxy-quinoline-copper-chromium complex, olive-green in colour, are thus obtained. This alcoholic solution is soluble in 50 parts of water.

B. 5 parts of this alcoholic solution, having a concentration of 12.7% of copper 8-hydroxy-quinolate, are dissolved in 1000 parts of water and treated with 5 parts of hexamethylenetetramine. A cotton twill fabric is steeped for thirty minutes in this bath, then drained to 100% and dried at 100–110° C. The fabric thus treated is subjected to washing for 20 minutes at 50°C. in a bath containing, per litre, 5 g. of soap and 2 g. of sodium carbonate, then dried and subsequently exposed to fungal attack according to the conditions prescribed by French standards. No development of moulds is observed.

*Example 10*

A. A suspension of 400 parts of chromic acid in 1300 parts of isopropyl alcohol is agitated and brought to the boil. The heating is then stopped and 438 parts of gaseous hydrochloric acid are introduced by means of a plunger. The chromic acid is thus reduced to trivalent chromium. When all the hydrochloric acid has been introduced, the mixture is heated under reflux for 30 minutes, and 304 parts of copper 8-hydroxy-quinolate are added. Refluxing is continued for two to three hours. An alcoholic solution of a mixed complex, olive-green in colour, is then obtained which is soluble in 50 parts of water.

B. An impregnating bath, prepared from this alcoholic solution in the manner indicated in Example 9, is treated with two parts of a non-ionic wetting agent. A cotton fabric, when treated by means of this solution by the method indicated in Example 9, does not show any attack by moulds after exposure to fungal action. This fabric retains this property even after washing.

*Example 11*

The operation is carried out as indicated in Example 9, paragraph A, but 1830 parts of lead 8-hydroxy-quinolate are used in place of copper 8-hydroxy-quinolate. An alcoholic solution of a mixed complex which is completely soluble in water is thus obtained.

*Example 12*

Operating as indicated in Example 10, paragraph A, but replacing the copper 8-hydroxy-quinolate by 305 parts of zinc 8-hydroxy-quinolate, there is finally obtained an alcoholic solution of a mixed 8-hydroxy-quinoline-zinc-chromium complex which is completely soluble in water.

*Example 13*

1066 parts of chromic chloride hexahydrate, 238 parts of nickel chloride hexahydrate and 650 parts of isopropyl alcohol are mixed. This mixture is vigorously agitated and slowly treated with 800 parts of an alcoholic solution containing 112 parts of caustic potash. When the mixture has become homogeneous, 242 parts of 8-hydroxy-quinoline are added and it is heated under reflux for two hours. After cooling, the insoluble potassium chloride is separated by filtration. An alcoholic solution of a mixed complex which is completely soluble in water is thus obtained.

*Example 14*

A mixture composed of 312 parts of magnesium 8-hydroxy-quinolate, 2000 parts of isopropyl alcohol and 1080 parts of chromic chloride hexahydrate is boiled and heated under reflux for one hour. An alcoholic solution of a mixed 8-hydroxy-quinoline-magnesium-chromium complex is thus obtained; it is brown-green in colour and completely soluble in water.

Example 15

250 parts of salicylaldehyde, 540 parts of chromic chloride hexahydrate, 180 parts of copper carbonate and 2000 parts of isopropyl alcohol are introduced into an apparatus provided with a reflux condenser and a stirrer. This mixture, well stirred, is heated under reflux for one hour. During this heating, evolution of carbon dioxide gas is observed. A perfectly clear alcoholic solution of a mixed complex, blue-green in colour and completely soluble in water, is finally obtained.

Example 16

100 parts of the copper salt of acetylacetophenone are mixed with 270 parts of chromic chloride hexahydrate and 280 parts of isopropyl alcohol. This mixture is agitated and heated under reflux for one hour. An alcoholic solution of a mixed complex, green in colour and completely soluble in water, is obtained.

Example 17

A mixture comprising 350 parts of acetylacetanilide, 100 parts of copper hydroxide and 1500 parts of isopropyl alcohol is vigorously agitated and heated under reflux for 30 minutes. 1200 parts of chromic chloride hexahydrate are then added and refluxing is continued for one hour. An alcoholic solution of a mixed complex soluble in water is thus obtained.

We claim:

1. A process for the preparation of water-soluble metallo-mixed complexes which comprises reacting in solution in an alcohol and at a temperature between 50° C. and 120° C. a basic chromic chloride with the copper salt of 8-hydroxy-quinoline.

2. A process as claimed in claim 1 in which the basic chromic chloride is chromic chloride hexahydrate.

3. A process as claimed in claim 1 in which the basic chromic chloride is provided by chromic acid, reduced by the alcohol and with the addition of hydrochloric acid.

4. A process as claimed in claim 1 in which the basic chromic chloride is provided by sodium chromate, reduced by the alcohol and with the addition of hydrochloric acid.

References Cited in the file of this patent

UNITED STATES PATENTS

| | | |
|---|---|---|
| 1,964,696 | Truabe et al. | June 26, 1934 |
| 2,549,220 | McLaren | Apr. 17, 1951 |
| 2,683,156 | Iler | July 6, 1954 |

FOREIGN PATENTS

| | | |
|---|---|---|
| 493,859 | Canada | June 23, 1953 |

UNITED STATES PATENT OFFICE

CERTIFICATE OF CORRECTION

Patent No. 2,904,572                                           September 15, 1959

Xavier Bilger et al

It is hereby certified that error appears in the above numbered patent requiring correction and that the said Letters Patent should read as corrected below.

In the heading to the printed specification, between lines 9 and 10, insert -- Claims priority, application France November 25, 1955 --.

Signed and sealed this 26th day of April 1960.

(SEAL)
Attest:

KARL H. AXLINE                                              ROBERT C. WATSON
Attesting Officer                                          Commissioner of Patents